(12) United States Patent
Allman et al.

(10) Patent No.: US 7,012,703 B2
(45) Date of Patent: Mar. 14, 2006

(54) AUTOMATIC ENCODER RESOLUTION CALIBRATION AND LENGTH MEASUREMENT SYSTEM AND METHOD

(75) Inventors: Andrew J. Allman, Bridgeton, MO (US); James E. Burton, Fenton, MO (US); Richard D. Allman, Bridgeton, MO (US)

(73) Assignee: AMS Controls, Maryland Heights, MO (US)

( * ) Notice: Subject to any disclaimer, the term of this patent is extended or adjusted under 35 U.S.C. 154(b) by 349 days.

(21) Appl. No.: 10/645,748

(22) Filed: Aug. 21, 2003

(65) Prior Publication Data

US 2005/0043851 A1    Feb. 24, 2005

(51) Int. Cl.
*G01B 11/14* (2006.01)
(52) U.S. Cl. ............... 356/616; 356/634; 250/231.13; 250/231.16
(58) Field of Classification Search ............... 356/614, 356/616, 625, 634; 250/231.13, 231.16
See application file for complete search history.

(56) References Cited

U.S. PATENT DOCUMENTS

| | | | | |
|---|---|---|---|---|
| 4,998,798 A | * | 3/1991 | Ishizuka et al. ............ 359/437 |
| 5,065,013 A | * | 11/1991 | Taylor ................... 250/231.18 |
| 5,383,014 A | * | 1/1995 | Nowak et al. ................ 356/28 |
| 6,052,192 A | * | 4/2000 | Harris et al. ................ 356/634 |
| 2005/0133705 A1 | * | 6/2005 | Hare et al. ............. 250/231.13 |

* cited by examiner

*Primary Examiner*—Hoa Q. Pham
(74) *Attorney, Agent, or Firm*—Senniger Powers (57) ABSTRACT

The invention is a system and method for automatically determining a resolution of an encoder, automatically calibrating the encoder resolution, and automatically determining a length of a workpiece from the encoder resolution and encoder count. The system comprises an encoder for generating an encoder signal indicative of linear movement of a moving workpiece traveling along a path. The system also comprises a first sensor positioned along the path traveled by the workpiece, the first sensor generating a first sensor signal in response to sensing an identifying characteristic of the workpiece. The system further comprises a second sensor positioned along the path traveled by the workpiece, the second sensor generating a second sensor signal in response to sensing the identifying characteristic of the workpiece, said second sensor being positioned a known distance from the first sensor along the path traveled by the workpiece. The system also comprises a processor for determining the encoder resolution as a function of the encoder signal, the first sensor signal, the second sensor signal, and the known distance between the first and second sensors.

38 Claims, 8 Drawing Sheets

AUTOMATIC ENCODER RESOLUTION CALIBRATION AND LENGTH MEASUREMENT SYSTEM AND METHOD

FIELD OF THE INVENTION

The invention relates generally to material processing production line systems utilizing an encoder. In particular, the invention relates to a system and method for automatically determining a resolution of an encoder, automatically calibrating the encoder resolution, and automatically determining a length of a workpiece from the encoder resolution and encoder count.

BACKGROUND OF THE INVENTION

Assembly line manufacturing systems often require measurement of working material, workpiece, or part produced on the assembly line. One method of measuring a workpiece produced on an assembly line is the manual measurement of the part after the part is manufactured. Each produced workpiece or a sample thereof is taken off the assembly line and manually measured by an operator. However, manually measuring parts and recording the data is time consuming and is subject to measurement and/or data-entry errors. Because of the time and expense required, typically only a small percentage of parts produced are manually measured.

In other systems, the assembly line utilizes limit switches or slide switches to measure a workpiece or a length of workpiece. In such systems, the workpiece moves along the assembly line and when a length of workpiece reaches a limit switch, the switch provides a signal to a controller. The controller may control one or more assembly line production units such as a cut-off press. When the limit switch indicates that the length of material has been achieved, the controller initiates a signal to the cut-off press that cuts the material to the desired workpiece length. Unfortunately, switches of the type are not accurate and are susceptible to variations in workpiece structure, placement, and velocity of the movement of the piece along the assembly line.

Another method is the use of an encoder. Industrial assembly line processes rely on use of a measuring wheel and a rotary encoder to track the movement of material or parts. The linear movement is calculated based on the number of electrical pulses generated per revolution and the circumference of the measuring wheel. The resolution of this measuring system is defined as the linear distance traveled per pulse of the encoder. However, operation systems utilizing an encoder encounter a number of conditions that cause the resolution of the encoder to be inaccurate, thereby resulting in inaccurate measurements. Problems or variations include wear of the wheel due to the wheel being in physical contact with the working material, material buildup on the wheel such as from manufacturing material, cuttings, shavings, dirt, etc. Additionally, poor tracking of the encoder wheel may result due to uneven surfaces on the working material, low friction between the encoder wheel and the working material, or bad alignment of the encoder wheel with the working material.

Two additional sources of length measurement errors are dependent on the type of equipment and type of workpiece or working material being measured. One of these is related to how the encoder wheel tracks on the material. If the encoder is not properly mounted, differences in the thickness of material can cause the encoder wheel to ride on different radii (if the wheel isn't running flat on the part). Because of this and related problems, different materials track differently and must be individually calibrated. Another cause of error is variations in material stretch through a roll-former or similar assembly line equipment. In cases where the encoder is located before the forming process, the stretch of the material must be adjusted for. The material stretch factor may change from coil to coil which requires the operator to make frequent calibrations.

Machine operators frequently attempt to correct the resolution value during operation to provide the desired accurate production and measurement of material from the assembly line. The calibration process is typically straightforward, but can be time-consuming if done properly. In the simplest form, the operator runs a single part and compares the measured length against the programmed length. In practice, an operator obtains a sample of parts produced by the manufacturing process by manually removing them after production and measuring each part. The operator or engineer calculates an average value of the sampled parts. The determined average value is compared against the desired length. The ratio of the desired length to the actual average value is multiplied with the current encoder resolution to determine a corrected resolution.

In the alternative, on length controllers that support it, the measured length is entered into the controller that does the calculations to adjust the effective resolution of the encoder. For best results, the operator should run several long parts, take the average length, and input this into the controller or manually calculate a new correction factor for the encoder resolution. In order to continuously insure accurate production of parts that fall within allowable or desirable tolerances, this manual process must be done on a regular and frequent basis. This process is not only time consuming but is costly both from requiring manual intervention, but also often requires a slow down in the production process. If not done properly or on a regular basis, the production line may produce out-of-spec parts that may be unusable or may not meet production line customer requirements.

Similarly, many assembly lines and operators provide operational data to a statistical process control (SPC) system. Measurement data is manually obtained from a sampled workpiece, recorded and entered into a separate computer system that stores and tracks the data. The SPC system produces statistical reports related to each assembly line or workpiece production. However, such a manual process is costly, time consuming, and is also prone to error.

Therefore, there is a need to provide for an automatic recalculation and updating of the encoder resolution to insure accurate measurement of working material and a workpiece produced from a manufacturing assembly line. There is also a need to eliminate manual measurement of produced parts, by automatically measuring each and every workpiece or part produced on a moving manufacturing assembly line as the workpiece moves along the assembly line, without manual intervention. There is also a need to automatically communicate measurements and data to a remote computer system for storing and for production of reports.

SUMMARY OF THE INVENTION

Recognizing these needs, the inventors of the present patent application invented a system that automatically calibrates encoder resolution and measures and records the length of each part produced on a moving assembly line. In one aspect, the invention relates to an encoder system comprising an encoder for generating an encoder signal indicative of linear movement of a moving workpiece traveling along a path. The system also comprises a first sensor positioned along the path traveled by the workpiece, the first sensor generating a first sensor signal in response to sensing an identifying characteristic of the workpiece. The system further comprises a second sensor positioned along the path traveled by the workpiece, the second sensor generating a second sensor signal in response to sensing the identifying characteristic of the workpiece, said second sensor being positioned a known distance from the first sensor along the path traveled by the workpiece. The system also comprises a processor for determining the encoder resolution as a function of the encoder signal, the first sensor signal, the second sensor signal, and the known distance between the first and second sensors.

In another aspect, the invention relates to a method comprising generating an encoder signal indicative of linear movement of a moving workpiece traveling along a path. The method also comprises generating a first position signal representative of an identifying characteristic of the workpiece reaching a first position along the path traveled by the moving workpiece and generating a second position signal representative of the identifying characteristic reaching a second position along the path traveled by the moving workpiece, said second position being a known distance from the first position. The method further comprises determining encoder resolution as a function of the encoder signal, the first position signal, the second position signal, and the known distance between the first and second positions.

In another aspect, the invention relates to a system comprising means for generating an encoder signal indicative of linear movement of a moving workpiece traveling along a path. The system also comprises sensing means for sensing an identifying characteristic of the moving workpiece. The system further includes means for determining a first encoder count in response to the sensing of the identifying characteristic by the sensing means at a first location along the path, and means for determining a second encoder count in response to the sensing of the identifying characteristics by the sensing means at a second location along the path. The system also includes means for determining encoder resolution as a function of the first encoder count, the second encoder count, and a known distance between the first and second sensing locations.

Other aspects of the present invention will be in part apparent and in part realized hereinafter by the drawings and the detailed description of the various embodiments of the invention.

BRIEF DESCRIPTION OF THE DRAWINGS

Corresponding reference characters and designations generally indicate corresponding parts throughout the drawings.

DETAILED DESCRIPTION

Figure 1A:
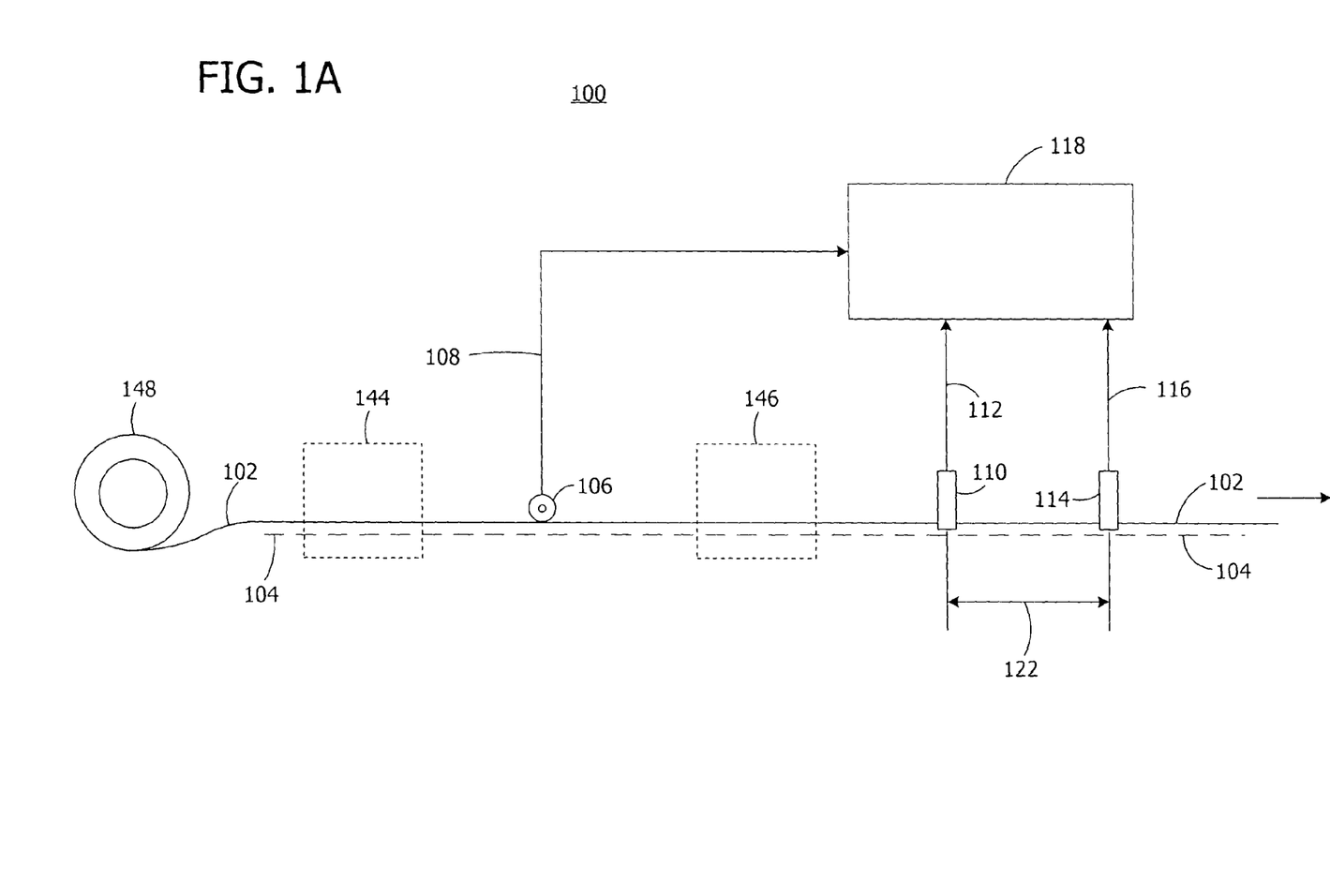
FIG. 1A is a block diagram of an automatic encoder calibration and length measurement system according to one embodiment of the invention.

FIG. 1A illustrates an assembly line configured with an automatic encoder calibration and length measurement system 100 according to one embodiment of the invention. The assembly line is used to produce and/or manufacture parts or one or more individual workpieces from workpiece 102. Workpiece 102 may be any assembly line manufactured material. Workpiece 102 may comprise one or more identifying characteristics that may be a physical characteristic of the workpiece such as a leading edge, a trailing edge, a notch, a lip, a protrusion, a hole or a flange. In the alternative, the identifying characteristic may be a mark or a tag that has been attached to the working piece. As shown as an example, workpiece 102 is formed on the assembly line from a roll 148. Workpiece 102 travels along the assembly line following a travel path 104 in a left to right direction as indicated by an arrow. Workpiece 102 flows past a first production line system 144 and a second production line system 146. In other applications, only a single production line system may be present, or more than two production lines systems may be applicable, two systems are shown only as an example of one application. Production line systems 144 and 146 may be any production line system used on an assembly line including roll formers, stamps, planes, cutters, punches, drills, sanders, painters, benders, etc. In one example such as a roll former, bulk workpiece material is located on roll 148. Workpiece 102 passes first production line system 144, which is a roll former. Workpiece 102 passes a second production line system 146 that cuts workpiece 102 into one or more cut workpieces 102A.

As illustrated in FIG. 1A, in one embodiment a first encoder 106 is located along path 104 and in relation to moving workpiece 106. Encoder 106 produces an encoder signal 106 that includes pulse or counts representative of the linear distance measured by encoder 106. Encoder 106 may be any encoder that measures the movement of workpiece 102 along path 104 of the assembly line. Such movement is traditionally a linear movement. An example of encoder 106 is an encoder wheel. A wheel encoder 106 produces pulses as the wheel rotates, the wheel being in contact with workpiece 102. Each pulse is representative of the linear distance traveled by the circumference of encoder wheel 106 and therefore the linear measurement of the movement of workpiece 102. One such wheel encoder 106 may be a twelve (12) inch-circumference encoder wheel that produces 8,000 pulses per revolution. Such an encoder wheel produces 666.66 pulses per inch. In another embodiment encoder wheel 106 may produce one pulse that is equal to four (4) counts by using two channels at 90-degree separation, thereby producing 4,000 counts per inch. Other wheel encoders and counts are also possible as are other non-wheel encoders. The resolution of encoder 106 is the equivalent linear distance corresponding to a single pulse or count within encoder signal 108.

The system further comprises a first sensor 110 that is positioned along path 104 traveled by workpiece 102 a first position. A second sensor 114 is also located along path 104 at a second position. First sensor 110 generates a first sensor signal 112 when first sensor 110 senses or detects an identifying characteristic of workpiece 102 relative to first sensor 110 as workpiece 102 travels along path 104. Similarly, second sensor 114 generates a second sensor signal 116 when second sensor 114 senses or detects the identifying characteristic of workpiece 102 relative to second sensor 114 as workpiece 102 travels along path 104 in close proximity to second sensor 114. Second sensor 114 is positioned at a known distance 122 from first sensor 110. First sensor 110 and second sensor 114 may be any type of sensor capable of detecting one or more identifying characteristics of workpiece 102. For example, these sensors may be optical sensors, video sensors, laser sensors, LED sensors, fiber optic sensors, radiographic sensors, ultrasonic sensors, infrared sensors, and/or electromagnetic wave sensors. First sensor 110 and second sensor 114 may be comprised of a single sensing device, or a set up of sensing devices comprised of more than one component. For example, in one embodiment first sensor 110 and second sensor 114 are comprised of LED sensors, each having an emitter and a receiver, the emitter and receiver of each of the first and second LED sensors being positioned on opposite sides of path 104 of moving workpiece 102.

In one embodiment, distance 122 must be fixed, nonmovable, and precisely known. Distance 122 is determined to be large enough to insure precise determination of encoder resolution. In one embodiment, distance 122 is equivalent or a function of the circumference of the wheel of encoder 106. This is desirable since a wheel is not uniform or not exactly circular. By establishing distance 122 as being equal to the circumference of the wheel of encoder 106, variations in the wheel may be minimized. In another embodiment, distance 122 may be defined as a function of the length of workpiece 102 after workpiece 102 has been cut by a cutting machine or cut-off press. For example, 122 may be 12.0118 inches where the cut length of workpiece to be measured is in the range of 3 to 6 feet. However, other distances would apply to distance 122 and may be in the range from a fraction of one inch to several feet.

A processor 118 receives encoder signal 108, first sensor signal 112 and second sensor signal 116. Processor 118 may be comprised of a memory (not shown) and a user device for inputting, among other data, distance 122. Processor 118 determines an encoder resolution as a function of encoder signal 108, first sensor signal 112, second sensor signal 116, and distance 122.

In operation, distance 122 is stored in memory (not shown) associated with processor 118. Encoder 106 is an encoder wheel that is positioned to be in contact with workpiece 102 and to rotate as workpiece 102 linearly travels along path 104. As workpiece 102 linearly moves, encoder 106 rotates and generates encoder signal 108 whose pulses are indicative of the linear movement of moving workpiece 102 traveling along path 104. Processor 118 receives encoder signal 108 and determines a count corresponding to each pulse in time. For instance, processor 118 assigns consecutive numbering to each pulse of encoder signal 108 to determine an encoder count that corresponds to the relative movement of encoder wheel 106. As encoder 106 rotates due to the linear movement of workpiece 102 along path 104, the encoder count increases for one or more received pulses depending on the number of encoder channels and design of encoder 106.

As workpiece 102 moves along the travel path (for example from left to right as indicated in FIG. 1A), an identifying characteristic such as the leading edge of workpiece 102 travels past first sensor 110. First sensor 110 generates first sensor signal 112 in response to sensing the identifying characteristic. First sensor signal 112 indicates the presence of the leading edge of workpiece 102 between the emitter and receiver of first sensor 110. Processor 118 receives, records and saves in a memory first sensor signal 112 and the corresponding first encoder count associated with encoder signal 108. As workpiece 102 continues to travel along path 104, the leading edge of workpiece 102 moves to the position of second sensor 114. When the identifying characteristic is sensed by second sensor 114, second sensor 114 generates second sensor signal 116. Processor 118 receives, records, and saves second sensor signal 116 and the corresponding second encoder count associated with encoder signal 108. Processor 118 determines encoder resolution as a function of encoder signal 108, first sensor signal 112, second sensor signal 116, and distance 122. In one embodiment, the number of encoder counts occurring between the sensing of the identifying characteristic by first sensor 110 and second sensor 114 is divided into distance 122 to determine the encoder resolution. As such, when encoder resolution is determined by dividing distance 122 that is measured in inches by the difference between the second encoder count and the first encoder count, the determined encoder resolution has a unit of measure of inches per encoder count.

Figure 1B:
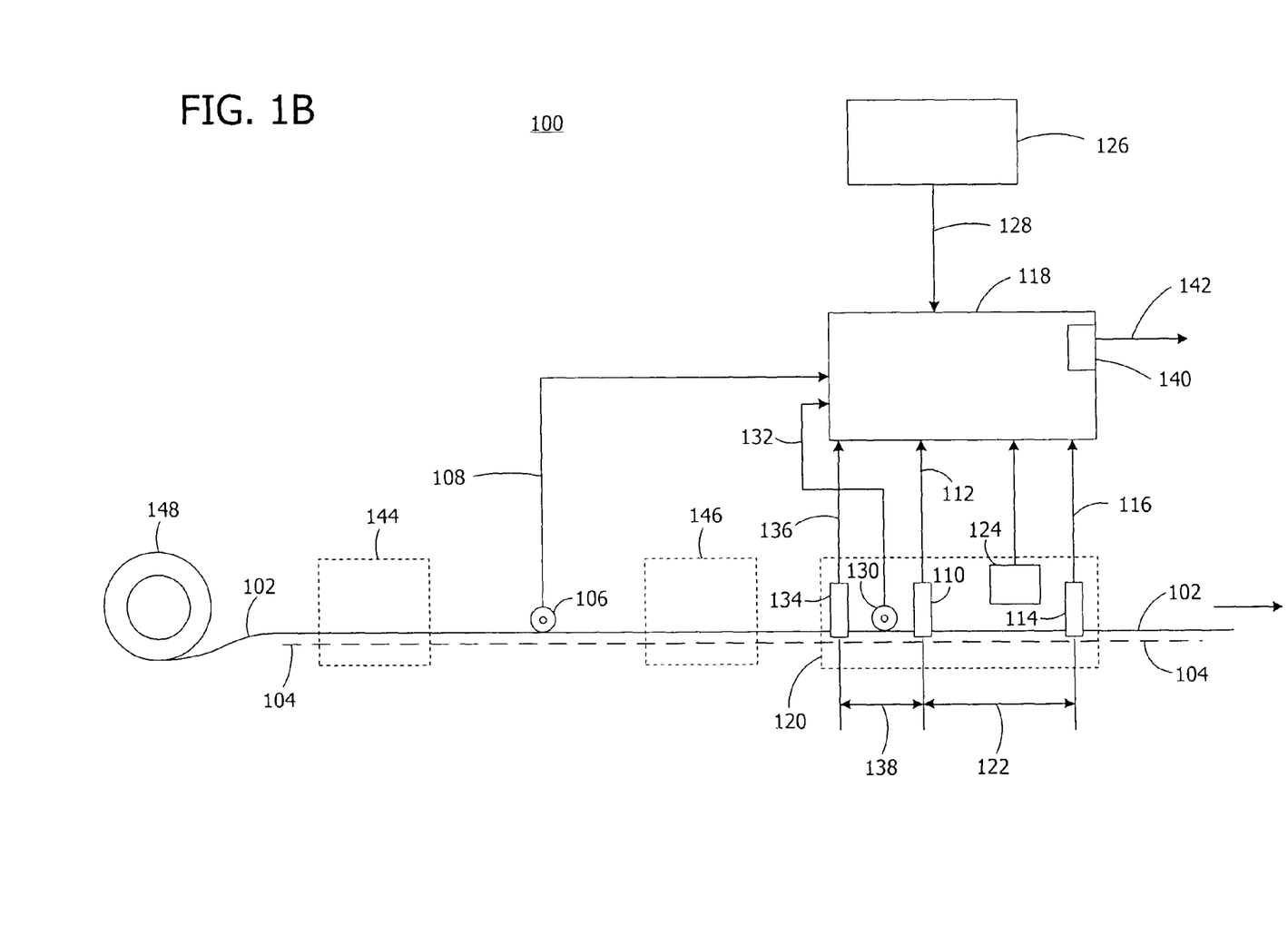
FIG. 1B is a block diagram of another automatic encoder calibration and length measurement system according to another embodiment of the invention.
Figure 3:
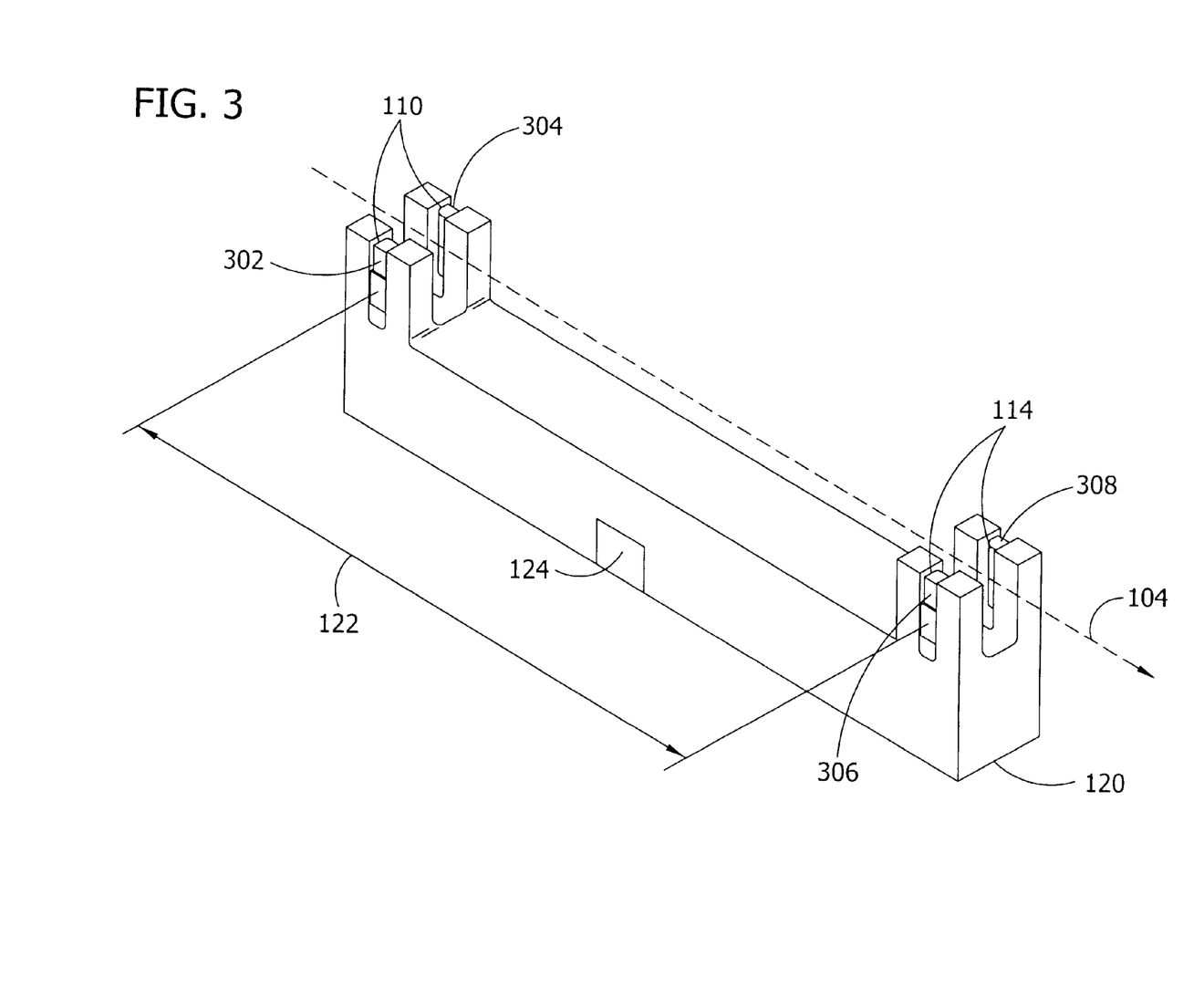
FIG. 3 is an illustration of an automatic encoder calibration and length measurement system mounting block according to one embodiment of the invention.

FIG. 1B illustrates various optional aspects of the invention according to one or more embodiments. As noted earlier, it is desirable that first sensor 110 and second sensor 114 be positioned a known distance 122 apart. As such, in an optional embodiment, first sensor 110 and second sensor 114 are positioned on a mounting block 120. Mounting block 120 is configured to mount both first sensor 110 and second sensor 114 such that distance 122 is precisely and permanently defined. Mounting block 120 is positioned along path 104 such that workpiece 102 traverses first sensor 110 and second sensor 114 of mounting block 120. Mounting block 120 may be made of any material type such as a metal, a composite, wood, plastic, etc. In the preferred embodiment, mounting block 120 is made of steel. An example of one embodiment of mounting block 120 is illustrated in FIG. 3. Path 104 of workpiece 102 is shown by dotted line 104. In the embodiment of FIG. 3, first sensor 110 is comprised of first transmitter 302 and first receiver 304 and second sensor 114 is comprised of second transmitter 306 and second receiver 308. In an alternative embodiment, first sensor 110 and second sensor 114 are positioned on one or more components or physical features of the assembly line such as a railing, an edge, or a manufacturing production line system.

In yet another embodiment, a temperature sensor 124 is positioned on or near first sensor 110 and second sensor 114, in which one embodiment may be on mounting block 120 or in the alternative may be a physical feature of the assembly line as discussed above. Naturally, due to expansion and contraction distance 122 will change as a function of the temperature of the material on which the sensors are mounted. Thus the accuracy of the determinations is increased by adjusting distance 122 as a function of a sensed temperature and the coefficient of expansion of the material. A temperature sensor 124 senses a temperature of a material on which first sensor 110 and second sensor 114 are mounted distance 122 apart. Processor 118 receives the sensed temperature. Processor 118 is configured to have access to a coefficient of expansion for the material on which first sensor 110 and second sensor 114 are positioned or mounted. Such the coefficient of expansion of the material may be stored in a memory. Processor 118 determines an adjusted distance 122B as a function of the coefficient of expansion of the material and the sensed temperature. Processor 118 then determines the encoder resolution as a function adjusted distance 122B.

Figure 2:
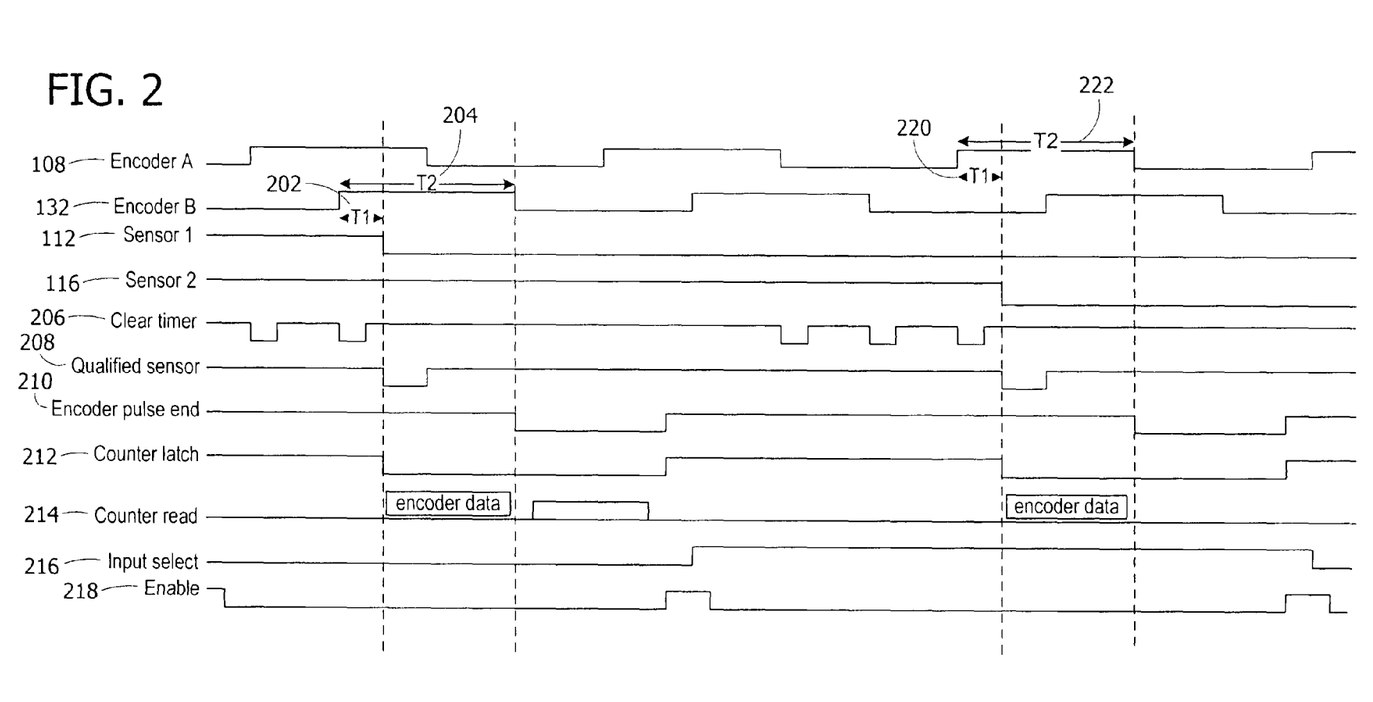
FIG. 2 is a timing diagram related to timing signals for automatic encoder calibration according to one embodiment of the invention.

In yet another embodiment, a high-speed timing circuit 126 generates a timing signal 128. As shown in FIG. 2, timing circuit 126 provides timing for the various sensor and encoder inputs to processor 118. As will be discussed below with regard to FIG. 3, timing signal 128 may be composed of a plurality of separate timing signals. These may include a clear timing signal 206, a qualified sensor signal 208, an encoder pulse end signal 210, a counter latch signal 212, a counter read signal 214, an input select signal 216, and an enable signal 218. Timing circuit 126 may operate to synch sensor signal 112 and encoder signal 108 to provide processor 118 with the capability for making determinations. Additionally, timing circuit 126 provides for other necessary timing for processor 118 and various signals and system components. In one embodiment, the timing circuit 126 acts as an interface between various system components and signals and processor 118 thereby providing necessary system and signal timing. These may comprise encoder signal 108, first sensor signal 112, and second sensor signal 116. Processor 118 receives timing signal 128, and sensor signals 112 and 116 and encoder signal 108 and determines a fractional portion of the first encoder count and a fractional portion of the second encoder count based on received timing signal 128 as shown in one embodiment of a timing diagram in FIG. 2. Processor 118 determines the encoder resolution as a function of the fractional first encoder count, the fractional second encoder count, and distance 122.

In another related embodiment, processor 112 determines the encoder resolution as a function of a fractional portion of a first encoder count ef1 and a fractional portion of the second encoder count ef2, the first encoder count ef1 and the second encoder count ef2 being determined as follows:

$$ef1 = 2*(ts1/te1) \text{ and} \quad (1)$$

$$ef2 = 2*(ts2/te2) \quad (2)$$

where te1 is a timing width of a first encoder signal pulse, te2 is a timing width of a second encoder signal pulse, ts1 is a timing period from start of the first encoder signal pulse to the generating of first sensor signal 112, and ts2 is a timing period from the start of the second encoder signal pulse to the generating of second sensor signal 116.

As noted, FIG. 2 illustrates a timing diagram illustrating these and other timing events according to one embodiment of the invention. In FIG. 2, time starts at the left and increases as time moves to the right. Encoder A signal 108 and encoder B signal 132 illustrate pulses generated by encoder 106 and/or encoder 130 as workpiece 102 travels path 104. Encoder A signal 108 and encoder B signal 132 may be signals from the same encoder 106 or two separate encoders 106 and 130. In one embodiment, encoder B signal 132 is a second reading of encoder 106 such as associated with a second instance of encoder A signal 108. In the alternative, encoder B signal 132 is generated by second encoder 130 (see FIG. 1B). The width of a pulse 204 of encoder B signal 132 is identified as T2 or 204. Similarly, encoder B signal 108 is identified wherein the width of second encoder pulse 222 is identified as T2 or 222. First sensor signal 112 and second sensor signal 116 illustrate the occurrence of the sensing of the identifying characteristic of workpiece 102 by first sensor 110 and second sensor 114, respectively. As discussed above, the first encoder count is the count determined by processor 118 associated with the pulse with width 204. The second encoder count is the count determined by processor 118 associated with the pulse with width 222. In order to increase the accuracy of the determination of the encoder resolution, a fractional portion of pulse with width 204 and the pulse with width 222 is determined. The fraction portion is determined by measuring the time or time period between the beginning of the encoder pulse and the occurrence of the associated sensor signal. As shown in FIG. 2 for first sensor signal 112, the time period T1 is the time from the beginning of the pulse with width 204 until the occurrence of sensor signal 112, which is denoted 202. As such, the fractional portion of encoder B signal 132 may be determined from the fractional portion of pulse with width 204, e.g., from the ratio of T1 202 and T2 204. Similarly, for second sensor signal 116 the time period T1 220 is the time from the beginning of the pulse with width 222 until the occurrence of sensor signal 116, which is denoted 220. As such, the fractional portion of the encoder A count may be determined from the fractional portion of the pulse with width 222, e.g., the ratio of T1 220 and T2 222.

Also illustrated in FIG. 2 are various embodiments of timing signal 128 as discussed above. These include a clear timer signal 206, a qualified sensor signal 208, an encoder pulse end signal 210, a counter latch signal 212, a counter read signal 214, an input select signal 216, and an enable signal 218. As shown in the embodiment of FIG. 2, the counter latch signal 212 goes low when the qualified sensor signal 208 goes low. When the counter latch signal 212 goes low, the counter read signal 214 reads the encoder data (see FIG. 2, counter read signal 214). As illustrated in FIG. 2, timing circuit 126 alone or in combination with processor 118 may be configured to provide various timing signals 128 and to define the relationship between various timing signals 128 or timing events.

In another embodiment, the length of a portion or piece of a first workpiece 102A that has been cut from workpiece 102 may be determined. In such an embodiment, the identifying characteristic may be a leading edge of first workpiece 102A and second workpiece 102B. In this case, first sensor 110 generates a second first sensor signal 112B in response to sensing a leading edge of a second workpiece 102. Processor 118 determines a length of the first workpiece 102A as a function of encoder signal 108, first sensor signal 112A, second first sensor signal 112B, and the determined encoder resolution.

Figures 4A, 4B, 4C:
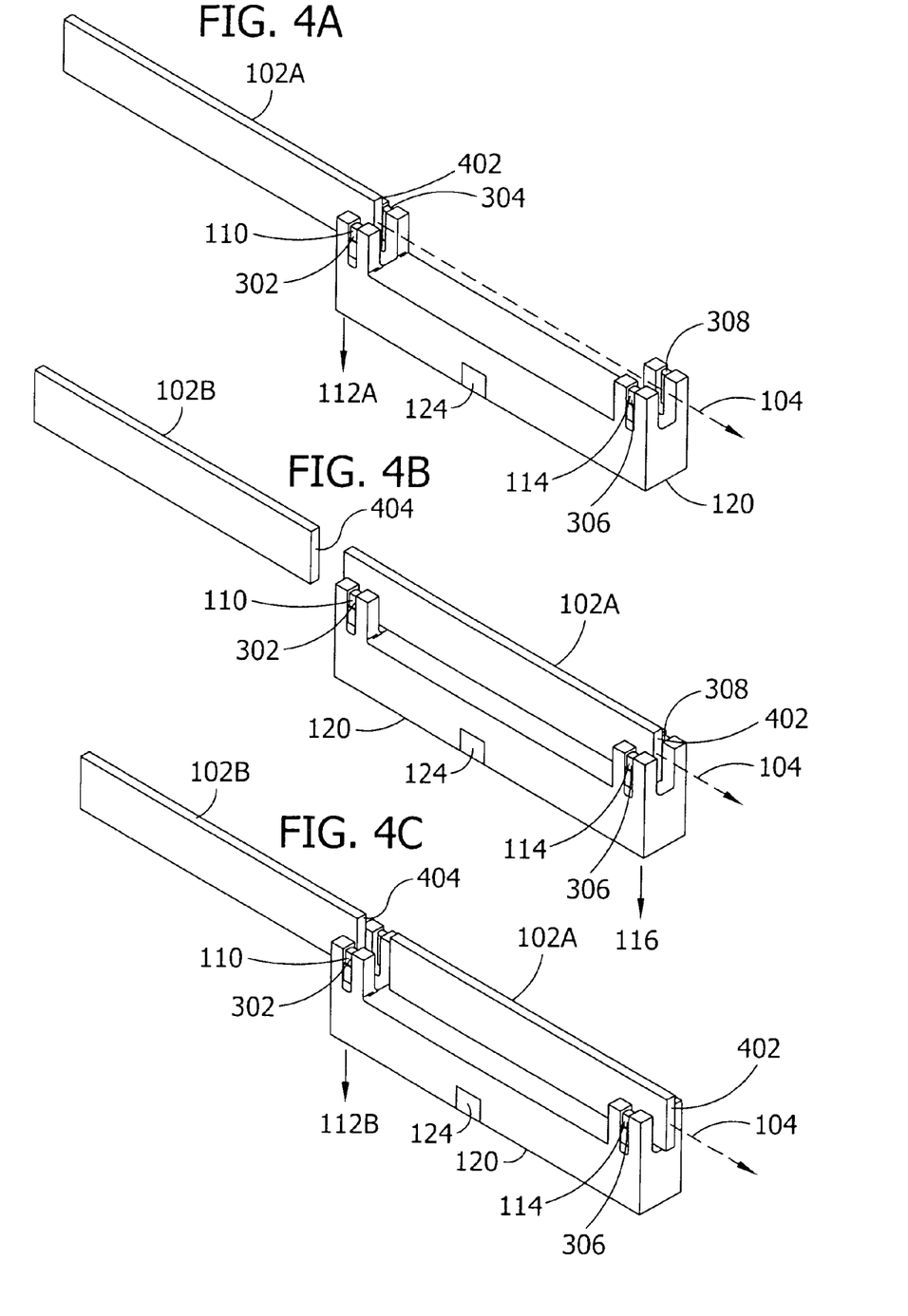
FIGS. 4A to 4C are three illustrations of the automatic encoder calibration and length measurement system mounting block in conjunction with a moving workpiece according to one embodiment of the invention.

An embodiment according to this process is illustrated in FIGS. 4A, 4B, and 4C. As shown, mounting block 120 is configured with first sensor 110 and second sensor 114 positioned along path 104. Path 104 is indicated by the dotted line wherein the arrow indicates the direction of movement of workpiece 102 along path 104 from left to right. First sensor 110 is comprised of first sensor transmitter 302 and first sensor receiver 304, the first sensor receiver 304 being located on the opposite side of path 104 from first sensor transmitter 302 such that workpiece 102 passes between them. Similarly, second sensor 114 is comprised of second sensor transmitter 306 and second sensor receiver 308, each of which are on opposite sides of path 104. As shown in FIG. 4A, first workpiece 102 has leading edge 402. When first leading edge 402 passes between first sensor transmitter 302 and first sensor receiver 304, first sensor 110 generates first sensor signal 112A. When processor 118 receives first sensor signal 112A, processor 118 records the first encoder count corresponding to the encoder signal 108. Workpiece 102 continues to move along path 104 until first leading edge 402 is positioned as shown in FIG. 4B between second sensor transmitter 306 and second sensor receiver 308. When second sensor 114 senses first leading edge 402, second sensor 114 generates second sensor signal 116. Processor 118 receives second sensor signal 116 and records a second encoder count as determined from encoder signal 108. Processor 118 determines the encoder resolution as a function of the first encoder count, the second encoder count, and distance 122 as discussed above.

First workpiece 102A continues to move along path 104 until the trailing edge of workpiece 102A passes between first sensor transmitter 302 and first sensor receiver 304. Second workpiece 102B follows along path 104 in close proximity to first workpiece 102A. Second workpiece 102B has a leading edge 404. When first sensor 110 senses leading edge 404, first sensor 110 generates a second first sensor signal 112B. Processor 118 receives second first sensor signal 112B and records a third encoder count as determined from encoder signal 108. Processor 118 then determines the length of workpiece 102 by determining the difference between the third encoder count and the first encoder count and multiplying that amount by the determined encoder resolution.

As illustrated in FIG. 2, processor 118 monitors numerous signals and the timing of the signals. During operation, processor 118 receives continuous encoder signals 108 and determines the encoder count, monitors timers and resets timers. This occurs continuously as neither first sensor 110 nor second sensor 114 has sensed the identifying characteristic.

Figure 6:
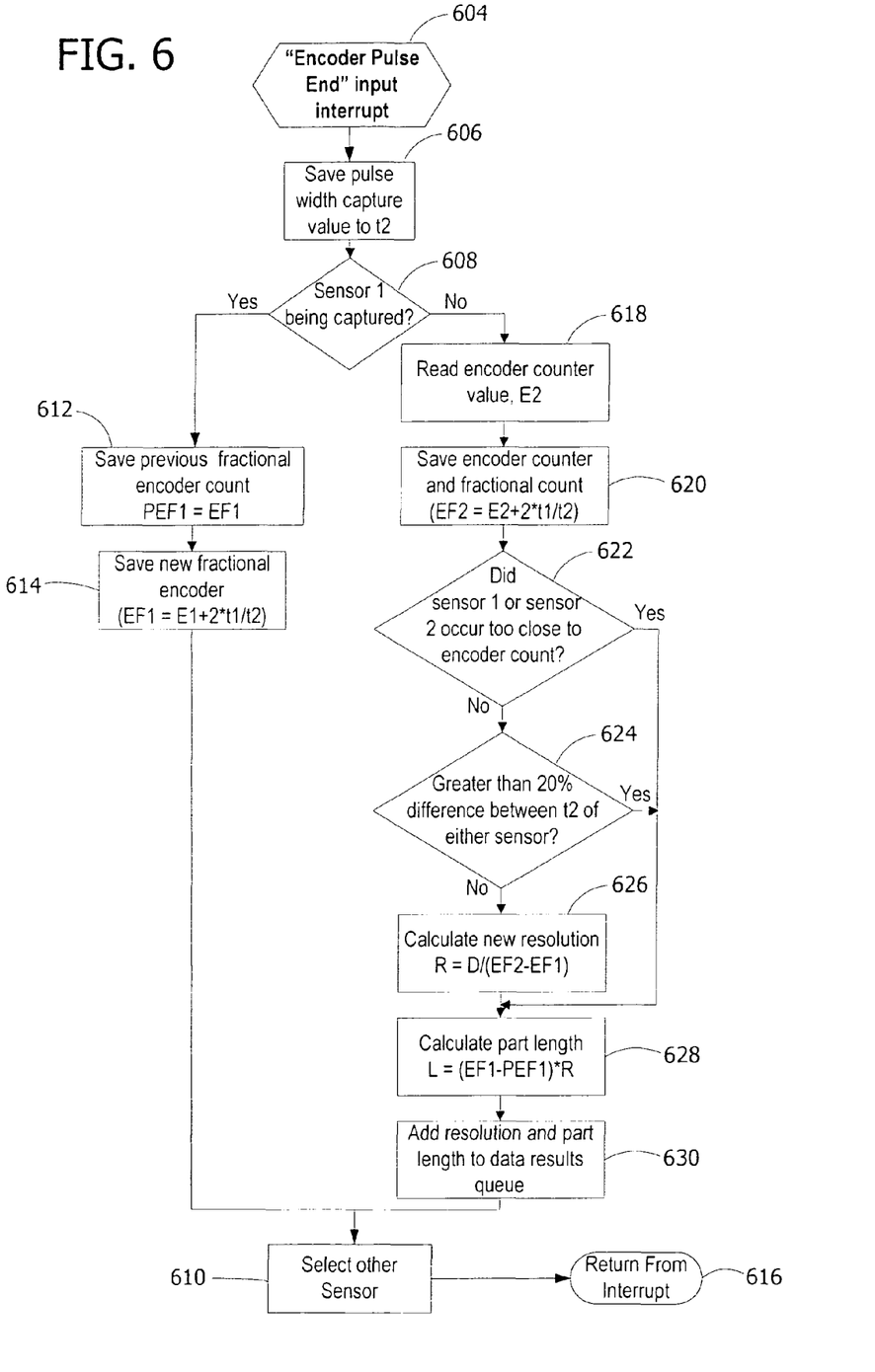
FIG. 6 is a flow chart illustrating steps in determining an encoder resolution according to one embodiment of the invention.
Figure 7:
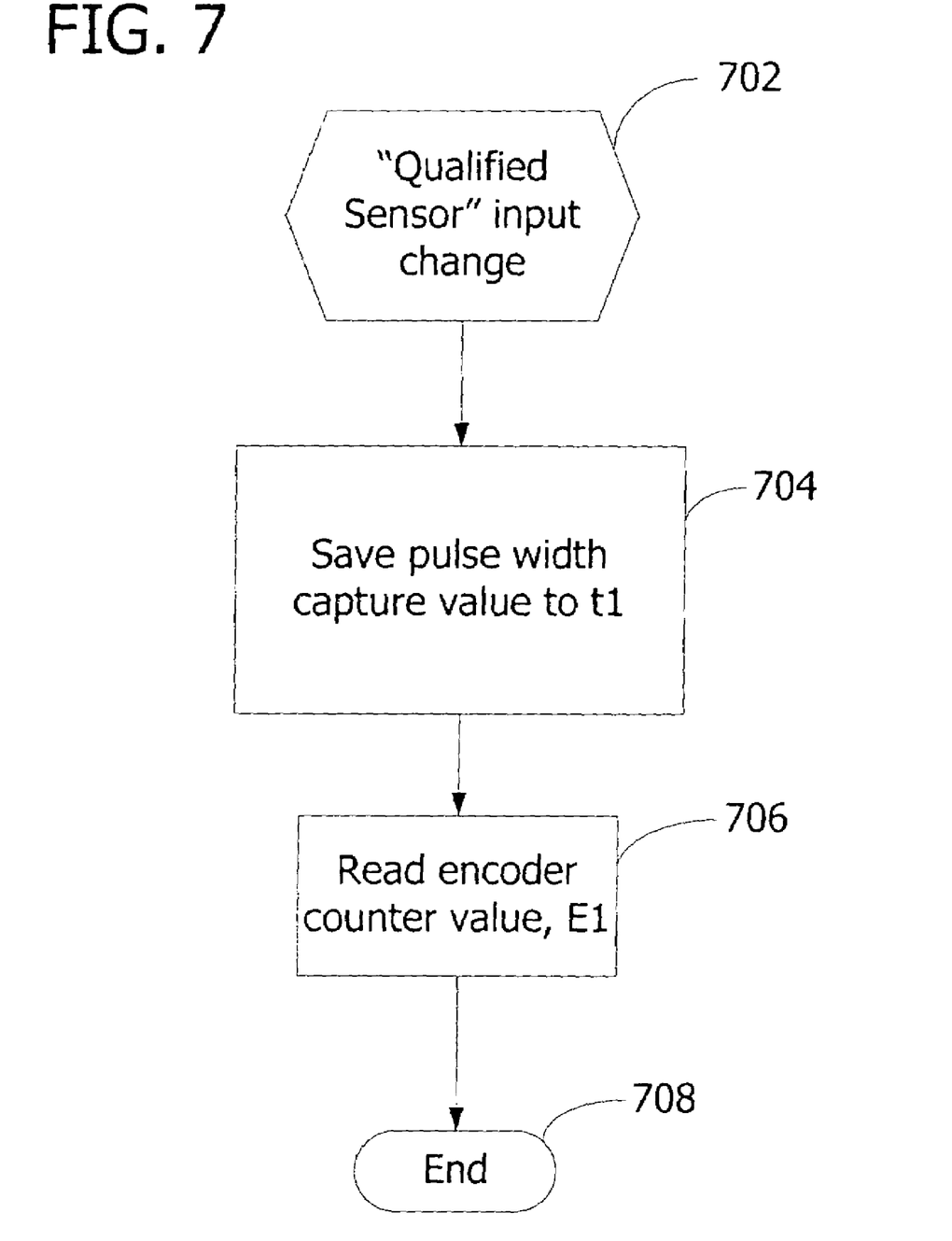
FIG. 7 is a flow chart illustrating steps related to one embodiment of the process associated with the qualified sensor input change.

However, when either first sensor 110 or second sensor 114 sensing the identifying characteristics, one or more process may be initiated, two of which are illustrated in FIGS. 6 and 7. FIG. 6 illustrates one portion of the process flow for processor 118 logic related to the encoder pulse end signal 210 and associated determinations as may be embodied in firmware or software as operating and/or feature code. As illustrated, when encoder pulse end input interrupt 604 is initiated by encoder pulse end signal 210, the pulse width t2 is captured and saved as shown in block 606. Next, block 608 determines whether first sensor signal 112 or second sensor signal 116 is generated and being captured. If first sensor signal 112 is present, block 612 saves the existing (existing prior to the receipt of the new signal) fractional encoder count EF1 as the previous encoder fractional count PEF1. In block 614 the new fractional encoder count EF1 is determined.

As indicated, in one embodiment new fractional encoder count EF1 is determined as the encoder count E1 (non-fractional, e.g., whole number of count of the encoder) and adds to that two times the fraction of the timing period t1 (the time from the start of the first encoder signal pulse to the generating of the first sensor signal 112) divided by the timing width t2 (the width of the first encoder signal 114 pulse). As this was first sensor signal 112, fractional encoder count EF1 is saved in memory. In operation, as the first sensor 110 detects the leading edge of workpiece 102, the encoder count associated with the current leading edge becomes new fractional encoder count EF1, and the immediate prior encoder count is saved in block 612 as the a previous fractional encoder count PEF1. Once the new fractional encoder count EF1 is determined from first sensor signal 112, the process selects the other sensor, in this case second sensor 114 in block 610 and returns from the process to an interrupt state as in block 616.

When block 608 next detects a sensor sensing from second sensor 114 as indicated by reception of second sensor signal 116, block 608 directs the process to block 618. At block 618, the encoder value is read and recorded as the second encoder count E2. Next, block 620 determines the second encoder count E2 or value as a second fractional encoder count EF2 similar to that discussed above where second fractional encoder count EF2 is equal to the second encoder count E2 plus two times the fraction of the timing period t1 (the time from the start of the second encoder signal pulse to the generating of second sensor signal 116) divided by a timing width t2 (the timing width of the second encoder signal pulse 114). In block 622, it is determined whether first sensor signal 112 occurred too close in time to second sensor signal 116 to provide an accurate determination of a new encoder resolution R. The system is programmed to determine a threshold requirement for comparison in this regard and if it is exceeded, the prior encoder resolution will be retained.

Similarly, block 624 compares the difference between the encoder pulse width of encoder signal 108 as associated with either first sensor signal 112 or second sensor signal 116. If it is determined that the difference between the pulse widths is greater than a predetermined amount, one embodiment of such an amount being 20 percent, the previous encoder resolution is retained and the length of workpiece 102 is determined from the previous encoder resolution. Pulse widths t2 as generated by encoder A signal 108 or encoder B signal 132 may vary for a number of reasons, including a change in the speed or velocity of movement of workpiece 102 or an error in encoder 106 generating encoder signals 108 or 132.

In an alternative embodiment, in order to minimize the number of encoder resolution determinations that are ignored or not used, processor 118 may determine an acceleration of the material. Processor 118 makes additional adjustments to the determinations to adjust for negative impacts related to changes in the speed of the movement of the workpiece 102. In another embodiment, processor 118 only eliminates or ignores the determined encoder resolution when the determined acceleration or change in acceleration exceeds a threshold level. If the determinations of block 622 and 624 are negative, then the process passes to block 626 that provides for the calculation of a new encoder resolution R. The new encoder resolution R is determined by dividing distance 122 by the difference between the second fractional encoder count EF2 and the first fractional encoder count EF1.

Block 628 provides for the determination of the length of workpiece 102. The process shown determines the length by multiplying the current encoder resolution, either new or previous, by the difference between first encoder count E1 and previous first encoder count PE1. In block 630, the current encoder resolution and determined length of workpiece 102 are saved in memory and added to a data results queue for communication via communication interface 140 to an external system or controller. In this embodiment, the process next flows to select other sensor as in block 610 and then returns from the interrupt state in block 616.

FIG. 7 illustrates one embodiment of qualified sensor signal 208 input change process. The process of FIG. 7 is initiated in block 702 when qualified sensor signal 208 changes state, as shown in FIG. 2 from a high position to a low position. In block 704, the pulse width capture value is saved by processor 118 and/or in associated memory (not shown). In block 706, encoder counter value E1 is read and saved. One embodiment of the timing for this process was discussed above and is shown in FIG. 2.

In yet another embodiment, a length between two identifying characteristics of the same workpiece 102 may be determined. For instance, the processing of workpiece 102 may include punching or drilling a hole at regular intervals on workpiece 102. It may be desirable to measure the distance or length between two holes. A first sensor signal 112 is determined when a first hole of workpiece 102 is sensed by first sensor 110. The first encoder count corresponding to the first sensor signal 112 is determined by processor 118. The encoder resolution is determined by processor 118 as discussed above by second sensor 114 detecting the same hole in workpiece 102 as it passes second sensor 114. When first sensor 110 senses a second passing of a second hole in workpiece 102, first sensor 110 generates a second first sensor signal 112B. Processor 118 records a third encoder count from the encoder signal 108 corresponding to the second first sensor signal 112B. Processor 118 determines a length or distance between the first hole and the second hole by subtracting the third encoder count from the first encoder count and multiplying that difference by the encoder resolution. As such, the length between two identifying characteristics of workpiece 102 is determined as a function of encoder signal 108, first sensor signal 112A, second first sensor signal 112B, and the determined encoder resolution.

In another embodiment, a third sensor 134 as shown in FIG. 1B is positioned at a third position that is a second known distance 138 from first sensor 110. Third sensor 134 is positioned on an opposite side of first sensor 110 from second sensor 114 and along path 104 prior to first sensor 110, such that workpiece 102 passes third sensor 134 prior to passing first sensor 110 or second sensor 114. In this embodiment, encoder 106 may be positioned between third sensor 134 and first sensor 110, as shown in FIG. 1B as encoder 130. In other embodiments, encoder B may be a second encoder 130 that generates a second encoder signal 132 (encoder B signal), each of which may be in addition to encoder 106 and encoder signal 108. Third sensor 134 generates a third sensor signal 136 in response to sensing the identifying characteristic of workpiece 102.

One operation of this embodiment provides for the measurement of workpiece 102 that has been cut prior to the workpiece traveling along path 104 and passing any of the sensors. In such an embodiment, the leading edge of workpiece 102 passes third sensor 134 and then encoder 130. When the leading edge of workpiece 102 passes first sensor 110, first sensor signal 112 is generated and processor 118 determines a first encoder count from encoder A signal 108 or encoder B signal 130, depending on which encoder embodiment is chosen. Workpiece 102 continues along path 104 wherein the leading edge of workpiece 102 passes second sensor 114 that generates second sensor signal 116. Processor 118 determines the second encoder count corresponding to second sensor signal 116 and then determines the encoder resolution as discussed above as a function of the first encoder count, the second encoder count, and distance 122. Workpiece 102 continues to move along path 104. The trailing edge of pre-cut workpiece 102 passes third sensor 134 that generates third sensor signal 136. Processor 118 determines the third encoder count associated with encoder A signal 108 or encoder B signal 132 that corresponds to third sensor signal 136. Processor 118 determines the length of pre-cut workpiece 102 as a function of the first encoder count, the third encoder count, the determined encoder resolution, and distance 138, the distance between third sensor 134 and first sensor 110. This system and method may also be used to determine the length of any workpiece 102, or to determine a length between two identifying characteristics of workpiece 102.

As shown in FIG. 1B, processor 118 may also be configured to include a communication interface 140 for communicating with one or more external systems. In one such embodiment, processor 118 may initiate a control signal or command 142 that is communicated via communication interface 140 to another production line control system which controls one or more production line systems or to an administrative, management, statistical control, or quality assurance system. Additionally, processor 118 may provide statistical or other data to a remote system configured with a graphical display that may display one or more reports or data associated with one or more operations of automatic encoder calibration and length measurement system 100.

Figure 5:
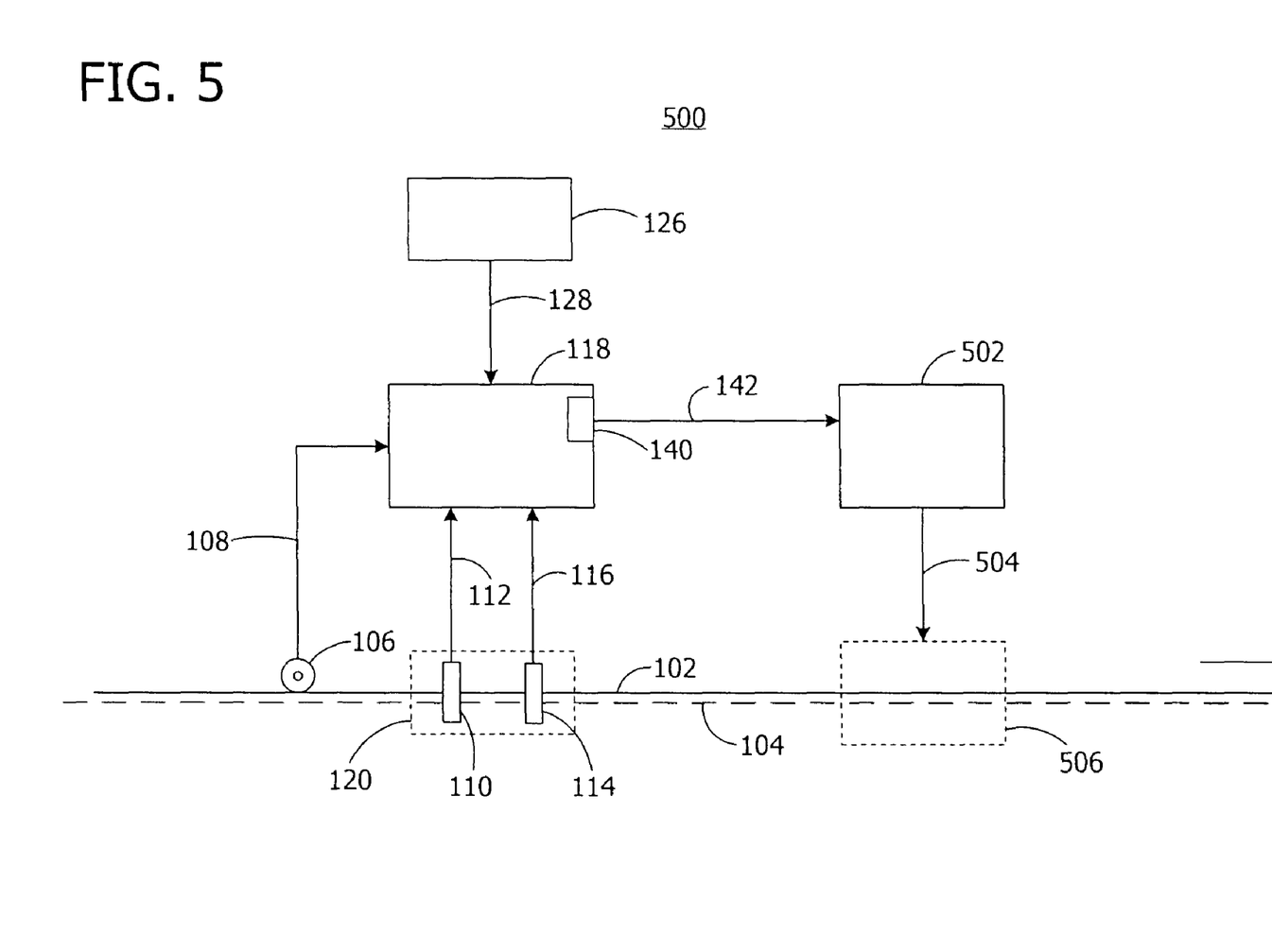
FIG. 5 is a block diagram of a production line control system configured with an automatic encoder calibration and length measurement system according to one embodiment of the invention.

For example, referring now to FIG. 5, one embodiment of the invention is the automatic providing of length measurement and/or encoder resolution data to a production line controller 502 which may be prior to or after one or more components of automatic encoder calibration and length measurement system 100. As shown, assembly line production system 500 includes automatic encoder calibration and length measurement system 100 as discussed above in one or more embodiments and production line controller 502 that provides one or more production line control commands to production line system 506. Processor 118 determines encoder resolution and/or length of workpiece 102 for each workpiece 102 or part thereof produced by the assembly line process. Processor 118 generates a production line parameter and communicates the production line parameter via communication interface 140 as output signal 142. Such a production line parameter may be any parameter, including a length of workpiece 102, a length between two identifying characteristics, the encoder signal, and the encoder resolution.

Production line controller 502 receives the production parameter and in response determines a production line encoder resolution or takes other actions associated with controlling one or more functions of assembly line system 506. Production line controller 502 may be any type of controller for controlling one or more operations of a production line system, including a roll forming controller, a cut-to-length controller, and an extrusion line controller. In one embodiment of the invention, the production parameter may be a control command or a part rejection command. In the later embodiment, processor 118 may have in a memory (not shown) a desired workpiece length and allowable tolerance for workpiece 102 produced by the manufacturing process. Processor 118 would compare the determined workpiece length for each part to the desired workpiece length. When the determined workpiece length is out of tolerance, processor 118 generates an error signal 142 that is communicated via communication interface 140 to an external system such as a production line controller 502 (See FIG. 5). In this manner, production line controller may generate an error signal, halt the production line, divert the out-of-tolerance part, or initiate the production of a replacement part automatically.

As previously discussed, automatic encoder calibration and length measurement system 100 provides for precise determination of encoder resolution and lengths between identifying characteristics of workpiece 102 moving along path 104. These determinations are based in part on known distance 122 between first sensor 110 and second sensor 114, and in one embodiment based in part on second known distance 138, the distance between third sensor 134 and first sensor 110. As such, the accuracy of the determination of the encoder resolution and any length is enhanced by precisely knowing the values of distance 122 and/or distance 138.

To address this, another embodiment of the invention is an automatic encoder calibration and length measurement system 100 calibration fixture (not shown). The calibration fixture is designed to calibrate the automatic encoder calibration and length measurement system 100 to accurately determine distance 122 and/or distance 138. In one embodiment, calibration fixture is attached to mounting block 120 on which first sensor 110 and second sensor 114 are mounted. The calibration fixture comprises a higher resolution glass slide linear encoder, a DC brush motor, a lead screw, a steel plate, one or more limit switches, and a relay circuit. The lead screw is attached to the glass slide read head and the steel plate. The motor drives the calibration fixture assembly back and forth so that the steel plate interrupts first sensor 110 and second sensor 114 at roughly the same speed. Encoder signal 108 from the glass slide is provided to processor 118 that records the fractional encoder counts as discussed above, for each switch transition. Processor 118 is also comprised of forward and reverse outputs that control the DC motor. By running the plate back and forth several hundred times, a very accurate measurement of distance 122 or distance 138 is determined. Such a calibration may be performed at a remote site, or at the site of the manufacturing assembly line.

As noted earlier, processor 118 may be configured with communication interface 140 to provide one or more data or control signals 142 to external data processing systems or controllers. One such external system is a statistical process control (SPC) system. Processor 118 would automatically provide encoder resolution or length data for each and every workpiece or a subset thereof to the SPC system for storage and/or analysis. Such a system would save the data as production records along with other relevant information such as date, time, order number, workpiece 102 or roll 148 number, product type, workpiece material type, and operator number/identification.

In another embodiment, processor 118 provides a number of statistical measurements and analysis to a local or remote system or graphical display. Such data may include a qualification report or charts showing sample error histogram, minimum, maximum, average, encoder resolution, measured lengths, statistical values or data related to the latest samples or measurements, and/or charts with dynamically calculated control limits. Such an arrangement may provide predictive warning when assembly line machine problems start to occur. An example of such problems may be a boost valve sticking, die problems, problems with rails, etc. Additionally, the diagnostics may include monitoring of the resolution value to ensure that it is stable as variations in the resolution value may indicate a problem with encoder 106, an encoder mounting (not shown), or an encoder wheel (not shown).

In another embodiment, automatic encoder calibration and length measurement system 100 may be configured with a memory (not shown), a graphical display (not shown), and/or a user input device (not shown). In such an arrangement, an operator would utilize the display and input device to input data and operational features or commands to automatic encoder calibration and length measurement system 100 or processor 118 and the display would provide reports or data to the operator.

In view of the above, the systems and methods herein described provide substantial advantages over the prior art. Such advantages include the continuous and automatic determination of encoder resolution and the automatic determination of a length associated with each and every workpiece produced on an assembly line. The system and method herein described may be configured as a new system, or may be adapted for use with existing assembly line systems. In some embodiments, some of the aspects or components described herein may be shared with other systems. For example, encoder 106, first sensor 110, and/or processor 118 may be shared with other assembly line control systems.

Those skilled in the art will note that the order of execution or performance of the methods illustrated and described herein is not essential, unless otherwise specified. That is, it is contemplated that aspects or steps of the methods may be performed in any order, unless otherwise specified, and that the methods may include more or less or alternative aspects or steps than those disclosed herein.

As various changes could be made in the above exemplary constructions and methods without departing from the scope of the invention, it is intended that all matter contained in the above description or shown in the accompanying drawings shall be interpreted as illustrative and not in a limiting sense.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

What is claimed is:

1. An encoder system comprising:
    an encoder for generating an encoder signal indicative of linear movement of a moving workpiece traveling along a path;
    a first sensor positioned along the path traveled by the workpiece, the first sensor generating a first sensor signal in response to sensing an identifying characteristic of the workpiece;
    a second sensor positioned along the path traveled by the workpiece, the second sensor generating a second sensor signal in response to sensing the identifying characteristic of the workpiece, said second sensor being positioned a known distance from the first sensor along the path traveled by the workpiece; and
    a processor for determining the encoder resolution as a function of the encoder signal, the first sensor signal, the second sensor signal, and the known distance between the first and second sensors.

2. The system of claim 1 wherein the encoder comprises an encoder wheel for generating the encoder signal, said encoder wheel engaging the moving workpiece and rotating as the workpiece travels along the path, the encoder signal comprising pulses indicative of the linear movement of the workpiece generated by the rotary encoder wheel.

3. The system of claim 1, further comprising a mounting block on which the first sensor and the second sensor are mounted.

4. The system of claim 1, further comprising:
    a temperature sensor sensing a temperature of a material on which the first sensor and second sensor are mounted, wherein the processor is configured to determine an adjusted known distance and the encoder resolution as a function of the sensed temperature and a coefficient of expansion of the material on which the first and second sensors are mounted.

5. The system of claim 1 wherein encoder signal comprises a plurality of pulses, and wherein the processor determines a first encoder count as a function of a first encoder signal pulse corresponding to the first sensor signal and determines a second encoder count as a function of a second encoder signal pulse corresponding to the second sensor signal, the processor determining the encoder resolution as a function of the first encoder count, the second encoder count, and the known distance.

6. The system of claim 5, further comprising a high speed timing circuit generating a timing signal, said processor receiving the timing signal and determining a fractional portion of the first encoder count and a fractional portion of the second encoder count based on the received timing signal, said processor further determining the encoder resolution as a function of the fractional first encoder count, the fractional second encoder count, and the known distance.

7. The system of claim 1 wherein the encoder resolution is determined as a function of a fractional portion of a first encoder count $ef1$ and a fractional portion of the second encoder count $ef2$, the first encoder count $ef1$ and the second encoder count $ef2$ being determined as follows:

$$ef1 = 2*(ts1/te1) \text{ and}$$

$$ef2 = 2*(ts2/te2)$$

where $te1$ is a timing width of a first encoder signal pulse, $te2$ is a timing width of a second encoder signal pulse, $ts1$ is a timing period from start of the first encoder signal pulse to the generating of the first sensor signal, and $ts2$ is a timing period from the start of the second encoder signal pulse to the generating of the second sensor signal.

8. The system of claim 1 wherein the first and second sensors are selected from the following group of sensors: optical, video, laser, LED, fiber optic, radiographic, ultrasonic, infrared, and electromagnetic wave.

9. The system of claim 1 wherein the first and second sensors comprise LED sensors, each having an emitter and a receiver, the emitter and receiver of each of the first and second LED sensors being positioned on opposite sides of the path of the moving workpiece.

10. The system of claim 1 wherein the identifying characteristic comprises a physical characteristic of the workpiece.

11. The system of claim 1 wherein the identifying characteristic is a leading edge of a first workpiece, said first sensor further generating a second first sensor signal in response to sensing a second leading edge of a second workpiece, the processor determining a length of the workpiece as a function of the encoder signal, the first sensor signal, the second first sensor signal, and the determined encoder resolution.

12. The system of claim 1 wherein the identifying characteristic is a hole in a workpiece, said first sensor further generating a second first sensor signal in response to a second sensing of the identifying characteristic, the processor determining a length as a function of the encoder signal, the first sensor signal, the second first sensor signal, and the determined encoder resolution.

13. The system of claim 1, further comprising a production line controller receiving a production parameter, said production line controller being responsive to a production parameter for determining a production line encoder resolution.

14. The system of claim 13 wherein the production line controller is selected from the following group: a roll forming controller, a cut-to-length controller, and an extrusion line controller.

15. The system of claim 13 wherein the production parameter is selected from the following group: a length of the workpiece, a length between two identifying characteristics, the encoder signal, and the encoder resolution.

16. The system of claim 1 wherein the identifying characteristic is a leading edge, further comprising a third sensor positioned in a second known distance from the first sensor, the third sensor being positioned on an opposite side of the first sensor from the second sensor, the encoder being positioned between the third sensor and the first sensor, said third sensor generating a third sensor signal in response to sensing a trailing edge of the workpiece, wherein the processor determines a length of the workpiece as a function of the encoder signal, the first sensor signal, the third sensor signal, the second known distance, and the determined encoder resolution.

17. A method comprising:
generating an encoder signal indicative of linear movement of a moving workpiece traveling along a path;
generating a first position signal representative of an identifying characteristic of the workpiece reaching a first position along the path traveled by the moving workpiece;
generating a second position signal representative of the identifying characteristic reaching a second position along the path traveled by the moving workpiece, said second position being a known distance from the first position; and
determining encoder resolution as a function of the encoder signal, the first position signal, the second position signal, and the known distance between the first and second positions.

18. The method of claim 17 wherein generating the encoder signal comprises generating electrical pulses with an encoder wheel engaging the moving workpiece and rotating as the workpiece travels along the path.

19. The method of claim 17, further comprising positioning a first sensor at the first position and a second sensor at the second position, the first and second sensors being positioned on a mounting block adjacent the path traveled by the workpiece for generating the first and second position signals, respectively.

20. The method of claim 19, further comprising sensing a temperature of the mounting block, wherein an adjusted known distance and the encoder resolution is determined as a function of the sensed temperature and a coefficient of expansion of the mounting block.

21. The method of claim 17 wherein the encoder signal comprises a plurality of pulses, and determining the encoder resolution comprises:
determining a first encoder count as a function of a first encoder signal pulse corresponding to the first position signal;
determining a second encoder count as a function of a second encoder signal pulse corresponding to the second position signal; and
determining the encoder resolution as a function of the first encoder count, the second encoder count, and the known distance.

22. The method of claim 21, further comprising generating a high speed timing signal, wherein determining the encoder resolution comprises:

determining a fractional portion of the first encoder count as a function of the high-speed timing signal;

determining a fractional portion of the second encoder count as a function of the high speed timing signal; and determining the encoder resolution as a function of the fractional first encoder count, the fractional second encoder count, and the known distance.

23. The method of claim 17, further comprising determining a fractional portion of a first encoder count ef1 and determining a fractional portion of a second encoder count ef2 as follows:

$$ef1=2*(ts1/te1); \text{ and}$$

$$ef2=2*(ts2/te2)$$

where te1 is a timing width of a first encoder signal pulse, te2 is a timing width of a second encoder signal pulse, ts1 is a timing period from start of the first encoder signal pulse to the generating of the first position signal, and ts2 is a timing period from the start of the second encoder signal pulse to the generating of the second position signal.

24. The method of claim 17 wherein generating the first or second position signal comprises sensing by one of the following sensors: optical, LED, video, laser, fiber optic, radiographic, ultrasonic, infrared, and electromagnetic wave.

25. The method of claim 17 wherein generating the first or second position signal comprises determining the identifying characteristic of the workpiece from a first LED sensor and a second LED sensor, each of said first LED sensor and second LED sensor being comprised of an emitter and a receiver, the emitter and receiver of each being positioned on opposite sides of the path of the moving workpiece such that the moving workpiece travels between the emitter and the receiver of each of the first and second LED sensors.

26. The method of claim 17 wherein generating the first or second position signal comprises sensing a presence of a physical characteristic of the workpiece.

27. The method of claim 17, further comprising:
generating a second first position signal representative of a second identifying characteristic of the workpiece reaching the first position along the path traveled by the moving workpiece; and determining a length as a function of the encoder signal, the first position signal, the second first position signal, and the determined encoder resolution.

28. The method of claim 17 wherein the identifying characteristic is a leading edge of the workpiece, and further comprising:
generating a third position signal representative of a trailing edge of the workpiece reaching a third position a second known distance from the first position; and determining a length of the moving workpiece as a function of the encoder signal, the first position signal, the third position signal, the second known distance, and the determined encoder resolution.

29. The method of claim 17 further comprising:
generating a third position signal representative of the identifying characteristic reaching a third position along the path traveled by the workpiece, the third position a second known distance from the first position, the encoder being positioned along the path between the third position and the first position; and determining a length as a function of the encoder signal, the first position signal, the third position signal, the second known distance, and the determined encoder resolution.

30. The method of claim 17, further comprising determining a production line encoder resolution as a function of a production parameter.

31. The method of claim 30, further comprising determining a control command of a production line system as a function of the determined production line encoder resolution.

32. The method of claim 30 wherein the production parameter is selected from the following group: a workpiece length, a length between two identifying characteristics, the encoder signal, and the encoder resolution.

33. A system comprising:
means for generating an encoder signal indicative of linear movement of a moving workpiece traveling along a path;

sensing means for sensing an identifying characteristic of the moving workpiece;

means for determining a first encoder count in response to the sensing of the identifying characteristic by the sensing means at a first location along the path;

means for determining a second encoder count in response to the sensing of the identifying characteristic by the sensing means at a second location along the path; and means for determining encoder resolution as a function of the first encoder count, the second encoder count, and a known distance between the first and second sensing locations.

34. The system of claim 33, further comprising means for determining a production line encoder resolution as a function of a production parameter.

35. The system of claim 34 wherein the production parameter is selected from the following group: a length of the workpiece, a length between two identifying characteristics, an encoder signal, and the encoder resolution.

36. The system of claim 34 further comprising means for determining a control command for a production line system as a function of a production line encoder resolution and the production parameter.

37. The system of claim 33 wherein the identifying characteristic of the moving workpiece is a leading edge of the workpiece, further comprising:
means for determining a second first encoder count in response to sensing of a leading edge of a second workpiece; and means for determining a length of the first workpiece as a function of the first encoder count, the second first encoder count, and the encoder resolution.

38. The system of claim 33 wherein the identifying characteristic of the moving workpiece is a hole in the workpiece, further comprising:
means for determining a second first encoder count in response to sensing a second sensing of the hole in the workpiece; and means for determining a length as a function of the first encoder count, the second first encoder count, and the encoder resolution.

* * * * *